R. E. CLOUD & F. C. TAYLOR.
EMERGENCY RIM AND TIRE.
APPLICATION FILED JAN. 24, 1916.
1,185,769.
Patented June 6, 1916.
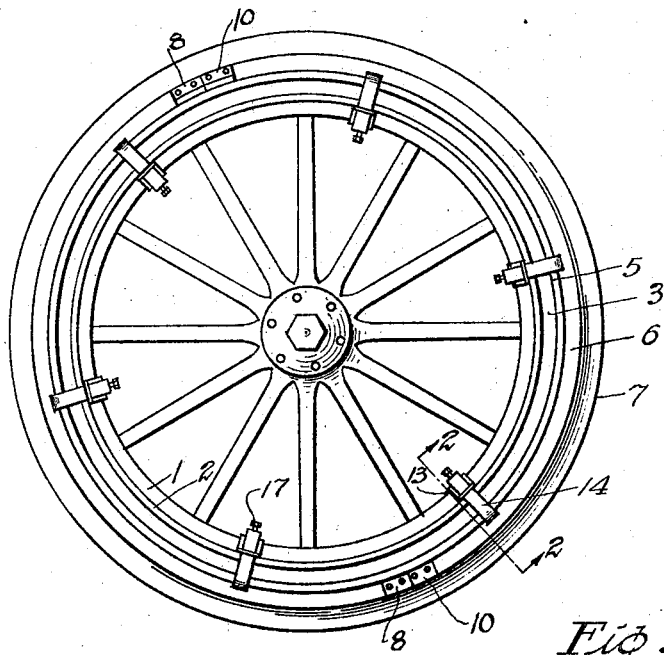
Fig 1
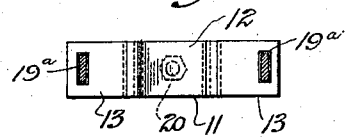
Fig 5
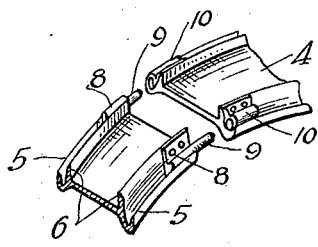
Fig 3
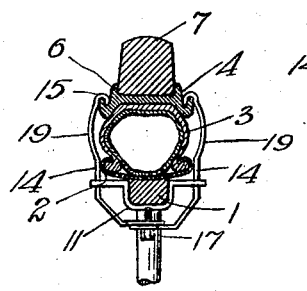
Fig 2
Fig 4
Witness
Inventors
Robert E. Cloud,
Flemen C. Taylor.
By
Attorney

UNITED STATES PATENT OFFICE.

ROBERT E. CLOUD AND FLEMEN C. TAYLOR, OF ENSLEY, ALABAMA.

EMERGENCY RIM AND TIRE.

1,185,769.  Specification of Letters Patent.  Patented June 6, 1916.

Application filed January 24, 1916. Serial No. 73,980.

*To all whom it may concern:*

Be it known that we, ROBERT E. CLOUD and FLEMEN C. TAYLOR, citizens of the United States of America, residing at Ensley, in the county of Jefferson and State of Alabama, have invented certain new and useful Improvements in Emergency Rims and Tires, of which the following is a specification.

The object of our invention is to provide an emergency rim and tire which is light and inexpensive and which can be readily mounted in position over a pneumatic tire of an automobile, after the latter has become punctured, and so connected to the wheel as to support the load on the wheel without injuring the punctured tire and without necessitating its immediate removal.

One object of our invention is to adapt the emergency rim and tire to be applied without disturbing the tire on the wheel, thus making it equally available for use with wheels having clencher or quick detachable rims and without regard to whether the tire supporting rim is made fast to or is itself removable from the wheel felly.

The emergency rim and tire is preferably made in the form of a metal rim provided with a cushion tread and the rim may be made in a solid ring or as a parted ring, according to the conditions under which it is to be used.

We claim as part of our invention the novel features of construction which are hereinafter described more in detail and claimed in the appended claims, reference being had to the accompanying drawings, in which:—

Figure 1 presents a side view of a wheel equipped with our emergency rim and tire. Fig. 2 is a sectional view on the line 2—2 of Fig. 1. Fig. 3 is a detail view showing the means for interlocking the rim sections. Fig. 4 is a detail view showing one form of the clamp means for connecting the emergency tire rim to the wheel rim. Fig. 5 is a plan view of Fig. 4.

Similar reference numerals refer to similar parts throughout the drawings.

We have illustrated our invention as applied to a wheel of any standard construction, that shown having the customary wooden felly 1 and a metallic clencher rim 2 made fast to the felly and having mounted thereon a pneumatic tire 3. When this tire becomes deflated by reason of punctures, blow-outs, or rim cuts, it is necessary either to repair the tire, to replace it, or to provide some emergency means by which the car may be run to the garage without injury to the deflated tire. With this object in view we have designed an emergency tire which may be formed as an integral metallic ring shaped rim 4 or it may be formed in half sections where the latter are more convenient for its application to the wheel. This rim 4 may itself serve as the emergency tire. It is provided with a channel in its inner face which conforms somewhat to the cross-sectional contour of the tread of the pneumatic tire 3 which is received therein, when the emergency tire is applied, as will be seen by reference to Fig. 2. We provide the rim 4 with annular outwardly facing grooves which leave outstanding side flanges 5. The outer or tread face of the tire or rim 4 is also preferably provided with annular shoulders 6 which form a seat for a cushion tread 7. When the emergency tire or rim 4 is made in sections we provide the meeting ends of the sections with brackets 8 carrying dowel pins 9, and with socket members 10, these parts being riveted to the sides of the rim and so arranged that the dowel pin is seated in the groove and braced thereby and that the socket member 10 acts with the groove and flange 5 to define the socket for the dowel pin. This arrangement is provided on each side of the rim and affords a simple but firm and rigid connection against relative movement of the sections otherwise than toward and from each other.

Having mounted the emergency tire or rim upon the pneumatic tire 3 in the manner already described, it becomes necessary to secure it firmly in place concentric with the wheel by mechanism capable of ready application and having maximum strength for its weight. To this end we have designed a special clamp construction which in its preferred form is shown in detail in Fig. 4. It will be seen to comprise a U-shaped bracket or brace member 11 shaped to fit about the inner face and the sides of the wheel felly 1. A fabric lining 12 may be inserted to prevent this bracket defacing the felly. The outer ends of the bracket extend out approximately to the wheel rim 2 and have out-turned flanges 13 which project beyond the rim 2 and are provided with slots 19ª which just clear the said rim 2. Bent metal clamp bars 14 are slidably connected to these bracket flanges, preferably by being passed through each of the slots 19ª and disposed on both sides of the wheel. These clamp bars have their outer ends inturned and hooked at 15 to engage over the flanges 5 on the emergency tire or rim and have their inner ends 16 inturned and lapped under the center of the bracket 11. The end 16 nearest the bracket is provided with a threaded opening through which a set screw 17 is screwed until it engages in a countersunk socket 20 at the center of the bracket 11. The end 16 of the inner clamp member is provided with an elongated slot 18 through which the set screw passes freely, the object of this being to provide for a sufficient relative play between the ends 16 when the set screw pressure is relaxed thereon by a few turns of the screw so that the hook ends 15 of the clamp arms can be sprung apart and over the flanges 5, this provision being desirable in view of the fact that these clamp arms are made of very stiff strong bars capable, by the joint action, of withstanding the lateral thrust strains on the emergency tire when in service, and if made in a solid piece it would be hard to spring them over the rims 2 and 4. The meeting faces of the ends 16 of the clamp bars are serrated so that they will positively interlock when forced together by the screw, which itself is held against transverse movement on the bracket by the socket 20. The clamp arms are bowed outwardly at 19 where they come opposite the sides of the pneumatic tire so as not to rub the latter. Between the bowed portions 19 and the inbent ends 16 of the clamp bars we provide a straight section of about one inch in length to provide for the relative adjustments required between the clamp bars and the bracket 11 in tightening the clamps and in applying them to the rim fellies of varying dimensions, it being understood that any suitable slip connection of the intermediate portions of the clamp arms to the wheel rim or felly will accomplish our object i. e., brace the arms against side thrust.

In applying the clamps, the set screws 17 are screwed outwardly, permitting the brackets 11 to drop down and release the ends 16 from clamping pressure so that they will swing together and permit the hook ends 15 of the clamp bars to spread sufficiently to be passed over the inner rim 2 and the emergency tire or rim 4 and into interlocking engagement with the flanges 5 of the latter rim. After this is accomplished each clamp screw is screwed inwardly, thus acting to force its bracket 11 firmly against the felly 1, after which the action of the screw is to interlock and force the clamp arms toward the hub until the clamp is rigidly set in position when it will be noted that the bracket 11 serves as an intermediate lateral brace for the bars 14, which greatly increases their capacity to resist lateral strains and which adapts both of the bars to coöperate in resisting lateral strain from either side. Moreover the clamps can be attached quickly and without difficulty to the wheel and without defacing the latter or requiring any change or modification of the wheel itself. As these clamps are applied at frequent intervals about the emergency tire or rim they act like short spokes to connect it to the wheel rim and to hold it in spaced relationship therefrom so as to prevent it pinching the pneumatic tire between it and the rim 2. It is obvious that these clamps will hold a solid rim as well as a sectional rim in operating position, as they will prevent any relative movements of the rim sections which can disengage their dowel pin and socket connections. Obviously any other suitable end connection or clamp for the rim sections may be employed but those shown are desirable for its simplicity and cheapness.

Having thus described our invention, what we claim as new and desire to secure by Letters Patent, is:—

1. In combination, an emergency rim adapted to surround the circumferential tread of the pneumatic tire on a wheel, and clamp means for attaching said rim in position, comprising U-shaped brackets which fit about the wheel felly and project beyond the wheel rim, clamp members which engage the emergency rim and slidably interlock with said brackets, and adjustable means adapted to engage said brackets and clamp members.

2. In combination, a wheel rim having a pneumatic tire mounted thereon, an emergency rim adapted to surround the circumferential tread of the tire and to stand in concentric spaced relationship with reference to said wheel rim, tension means to hold the rims concentric comprising pairs of clamp arms having portions at their outer ends which engage the emergency rim to prevent its outward movement and having portions at their inner ends which project inwardly past the wheel rim, means detachably mounted on the felly to guide and laterally brace said arms, and adjustable means disposed to act between the wheel felly and the inner ends of the pairs of clamps to bring them under the tension necessary to hold the rims concentric.

3. In combination, a wheel rim, an emergency rim concentric with and spaced from the wheel rim sufficiently to receive between them a pneumatic tire, clamp means to connect said rims concentric, said clamp means being connected at their outer ends to the emergency rim, means to slidably connect said clamp means at an intermediate point to said wheel rim, and adjustable means bearing against the wheel felly and the inner ends of said clamp means to hold the emergency rim concentric with the wheel felly.

4. In combination, an emergency rim adapted to be mounted on the tread of a pneumatic tire, clamp means for mounting said emergency rim, said means comprising U-shaped brackets adapted to fit snugly about the wheel felly and having slotted ends which project beyond the wheel rim, clamp bars which work through said slots, said bars being connected at their inner ends and having means at their outer ends adapted to interlock with the emergency rim, and adjustable means connected to said bars and interposed between them and the brackets and adapted to force said bars and brackets apart to set the clamp means.

5. The combination with an emergency rim adapted to seat on the tread of pneumatic tires, of clamp devices to secure said emergency rim in operating position comprising each a U-shaped clamp adapted to be passed outwardly over the wheel rim and tire and having means at its open end to interlock with the emergency rim, brackets adapted to engage the inner and side faces of the wheel felly and having end means to slidingly interlock with intermediate portions of the sides of said U-shaped clamps, and set screws connected to the clamps and engaging the inner face of the brackets, as and for the purposes described.

6. The combination with a wheel felly, a wheel rim mounted thereon, and a pneumatic tire on said rim, of an emergency rim seated over the pneumatic tire, detachable means to clamp said emergency rim in operating position, said means comprising a plurality of clamps each having a pair of side members having their outer ends hooked over and interlocked with the emergency rim, and having their inner ends inbent under the wheel felly, brackets having slotted ends to receive the side members of the clamps and having each an intermediate bend which fits snugly about the wheel felly, and set screws which engage said inbent ends of the side members and the inner face of their respective brackets, substantially as described.

7. The combination with a wheel felly, a wheel rim mounted thereon, and a pneumatic tire on said rim, of an emergency rim seated over the pneumatic tire, and detachable means to clamp said emergency rim in operating position, said means comprising a plurality of clamps each having a pair of side members having their outer ends hooked over and interlocked with the emergency rim, and having their inner ends inbent under the wheel felly, brackets having slotted ends to receive the side members of the clamps and having each an intermediate bend which fits snugly about the wheel felly, the inner ends of said side members being lapped opposite the center of the brackets, the end nearest the bracket having a threaded opening, and the other end having an elongated slot registering with said opening, and a radially disposed set screw passing through said slot and threaded through said threaded opening of each pair of side members and adapted to engage the inner face of their respective brackets opposite the felly center, substantially as described.

In testimony whereof we affix our signatures.

ROBERT E. CLOUD.
FLEMEN C. TAYLOR.

Witness:
NOMIE WELSH.

Copies of this patent may be obtained for five cents each, by addressing the "Commissioner of Patents, Washington, D. C."